United States Patent [19]
Ozaki

[11] Patent Number: 6,023,776
[45] Date of Patent: Feb. 8, 2000

[54] CENTRAL PROCESSING UNIT HAVING A REGISTER WHICH STORE VALUES TO VARY WAIT CYCLES

[75] Inventor: Shinji Ozaki, Osaka, Japan

[73] Assignee: Matsushita Electric Industrial Co., Ltd., Osaka, Japan

[21] Appl. No.: 08/821,370

[22] Filed: Mar. 20, 1997

[30] Foreign Application Priority Data

Mar. 22, 1996 [JP] Japan .................................. 8-065966

[51] Int. Cl.[7] ........................... G06F 11/00; G06F 12/00; G06F 7/00
[52] U.S. Cl. ................................ 714/55; 714/43; 714/34; 713/401; 713/501; 713/600
[58] Field of Search ........................... 395/182.1, 185.08, 395/551, 552, 553, 555, 559, 560; 371/1; 714/32, 34, 43, 40, 47, 55; 713/400, 401, 500, 501, 600

[56] References Cited

U.S. PATENT DOCUMENTS

| | | | |
|---|---|---|---|
| 5,386,539 | 1/1995 | Nishi .................................... | 395/425 |
| 5,442,775 | 8/1995 | Whitted, III et al. .................. | 395/550 |
| 5,479,647 | 12/1995 | Harness et al. ........................ | 395/550 |
| 5,634,043 | 5/1997 | Self et al. .............................. | 395/558 |
| 5,664,168 | 9/1997 | Yishay et al. .......................... | 395/559 |
| 5,692,165 | 11/1997 | Jeddeloh et al. ...................... | 395/551 |
| 5,729,766 | 3/1998 | Cohen ................................... | 395/878 |

FOREIGN PATENT DOCUMENTS 0 339 224  11/1989  European Pat. Off. .

*Primary Examiner*—Norman Michael Wright
*Attorney, Agent, or Firm*—McDermott, Will & Emery

[57] ABSTRACT

A CPU (central processing unit) including an instruction processor and a data processor is connected with a ROM (read only memory) bus, a RAM (random access memory) bus, and an IO (input-output) bus for inputting/outputting data independently of the ROM and RAM buses. A rewritable register included in a memory access controller stores a set value of the number of wait cycles in an access to a ROM, a set value of the number of wait cycles in an access to a RAM, and a set value for switching an input path in the data processor. These set values can be varied according to a cycle time of a CPU clock signal. In accordance with these set values, insertion of wait cycles in the instruction processor and the data processor is controlled, and it is determined whether or not an input of the data processor is latched.

10 Claims, 6 Drawing Sheets

CENTRAL PROCESSING UNIT HAVING A REGISTER WHICH STORE VALUES TO VARY WAIT CYCLES

BACKGROUND OF THE INVENTION

The present invention relates to a single-chip microcomputer.

A single-chip microcomputer including a CPU (central processing unit), a ROM (read only memory) and a RAM (random access memory) has been conventionally known.

In the case where the single-chip microcomputer is used as the so-called microcontroller, a CPU clock signal having a frequency in accordance with an object to be controlled is selected. However, access times of the ROM and RAM cannot be changed. Therefore, there can arise mismatching between the cycle time of the CPU clock signal and the access times of the ROM and the RAM.

SUMMARY OF THE INVENTION

The object of the present invention is providing a single-chip microcomputer in which an access mode to an internal memory can be flexibly changed in accordance with a cycle time of a CPU clock signal.

In order to achieve the object, the first single-chip microcomputer of the invention can change the number of wait cycles of a CPU in an access to the internal memory in accordance with a cycle time of the CPU clock signal.

Specifically, the first single-chip microcomputer of the invention comprises memory means (ROM and RAM) for storing instructions and data; bus means connected with the memory means; clock means for supplying an internal clock signal (CPU clock signal); processing means for starting an access to the memory means through the bus means in synchronization with the internal clock signal so as to execute a specific instruction or process a specific data in synchronization with the internal clock signal; and control means, including a rewritable register for storing a set value of a number of wait cycles determined in accordance with an access time of the memory means and a cycle time of the internal clock signal, for controlling the processing means so as to insert wait cycles in a number in accordance with the set value stored in the register.

In order to achieve the object, the second single-chip microcomputer of the invention can change a transfer path of data read from the internal memory in accordance with a cycle time of the CPU clock signal.

Specifically, the second single-chip microcomputer of the invention comprises memory means (such as a RAM) for storing data; bus means connected with the memory means; clock means for supplying an internal clock signal (CPU clock signal); data processing means for starting an access to the memory means through the bus means in synchronization with the internal clock signal so as to process a specific data in synchronization with the internal clock signal; bus latch means for latching data read to the bus means in synchronization with the internal clock signal; switching means for selectively supplying either data on the bus means or data latched by the bus latch means; preprocessing means for conducting a preprocessing on data supplied by the switching means; register means for storing the preprocessed data in synchronization with the internal clock signal; and control means for controlling the switching means in accordance with a switching set value. The control means include a rewritable register, and the register stores the switching set value determined in accordance with a relationship between a cycle time of the internal clock signal and a sum of an access time of the memory means and a time required for the preprocessing. The switching means is controlled in accordance with the switching set value stored in the register.

In this manner, in the present invention, the number of wait cycles of the CPU in an access to the internal memory can be changed in accordance with a cycle time of the CPU clock signal, and the transfer path of the data read from the internal memory can be changed in accordance with a cycle time of the CPU clock signal. As a result, a single-chip microcomputer having a high memory access efficiency can be realized.

DETAILED DESCRIPTION OF THE INVENTION

The present invention will now be described with reference to the accompanying drawings.

Figure 1:
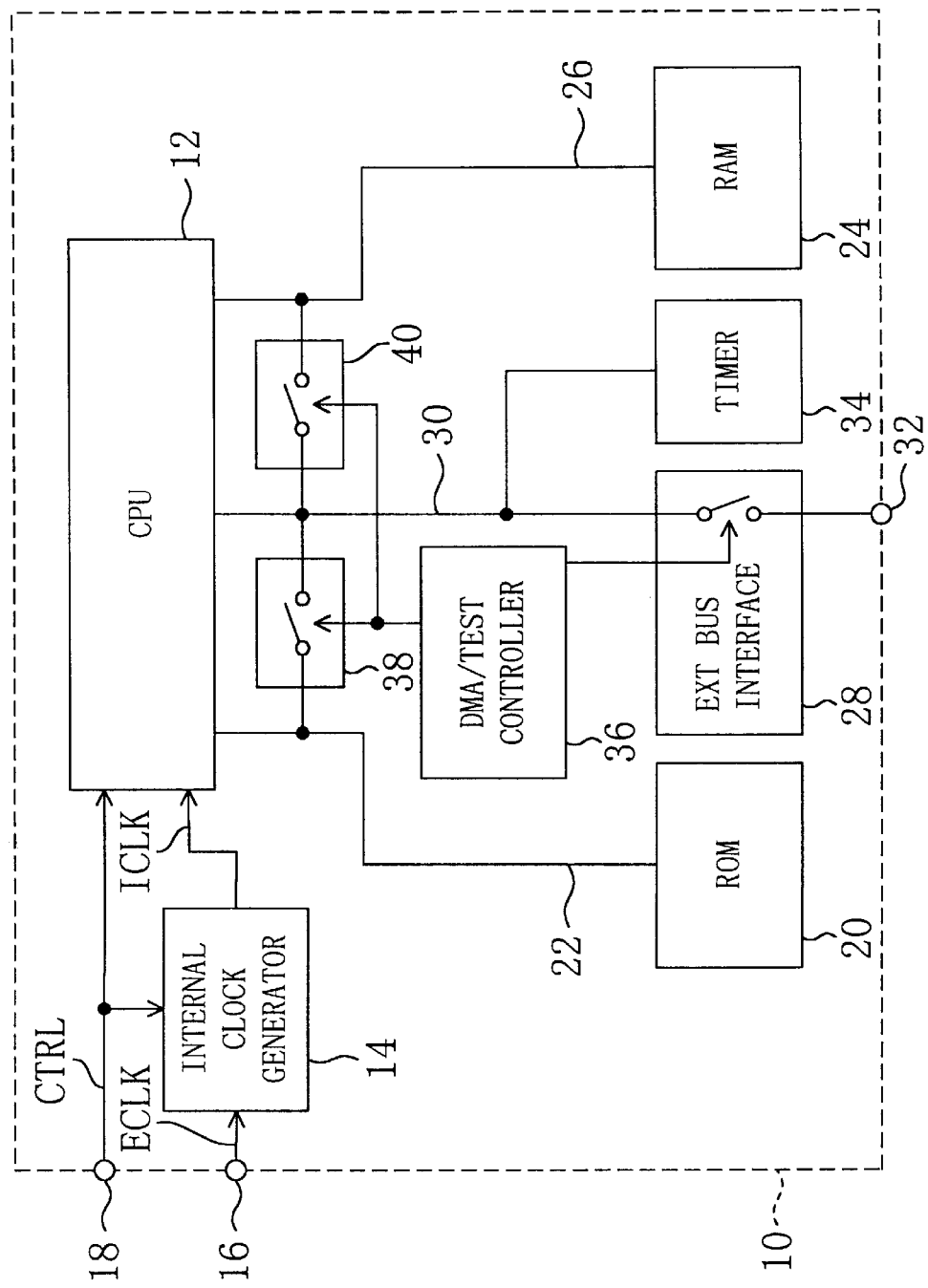
FIG. 1 is a block diagram of an exemplified configuration of a single-chip microcomputer according to the present invention.

FIG. 1 shows an exemplified configuration of a single-chip microcomputer according to the invention. The single-chip microcomputer 10 of FIG. 1 comprises a RISC (reduced instruction set computer) type CPU 12 having the so-called Harvard architecture, an internal clock generator 14 for supplying an internal clock signal ICLK to the CPU 12, an external clock terminal 16, and a clock control terminal 18. The internal clock generator 14 includes a PLL (phase locked loop) circuit, and generates the internal clock signal ICLK on the basis of an external clock signal ECLK supplied through the external clock terminal 16. A clock control signal CTRL supplied through the clock control terminal 18 determines a frequency ratio between the external clock signal ECLK and the internal clock signal ICLK. The microcomputer 10 further comprises a ROM 20 for mainly storing instructions, a ROM bus 22 for connecting the ROM 20 with the CPU 12, a RAM 24 for mainly storing data, and a RAM bus 26 for connecting the RAM 24 with the CPU 12. Moreover, the microcomputer 10 comprises an external bus interface 28, an IO (input-output) bus 30 independent of the ROM bus 22 and the RAM bus 26, and an external bus terminal 32 for inputting/outputting data. The external bus interface 28 manages the interface between the IO bus 30 and the external bus terminal 32. The IO bus 30 connects the external bus interface 28 with the CPU 12. The IO bus 30 is connected with a timer 34. The microcomputer 10 further comprises a DMA (direct memory access)/test controller 36 for controlling DMA data transfer and tests of the ROM 20 and the RAM 24, a ROM bus switch 38 and a RAM bus switch 40. The ROM bus switch 38 is interposed between the ROM bus 22 and the IO bus 30, and the RAM bus switch 40 is interposed between the RAM bus 26 and the IO bus 30.

Figure 2:
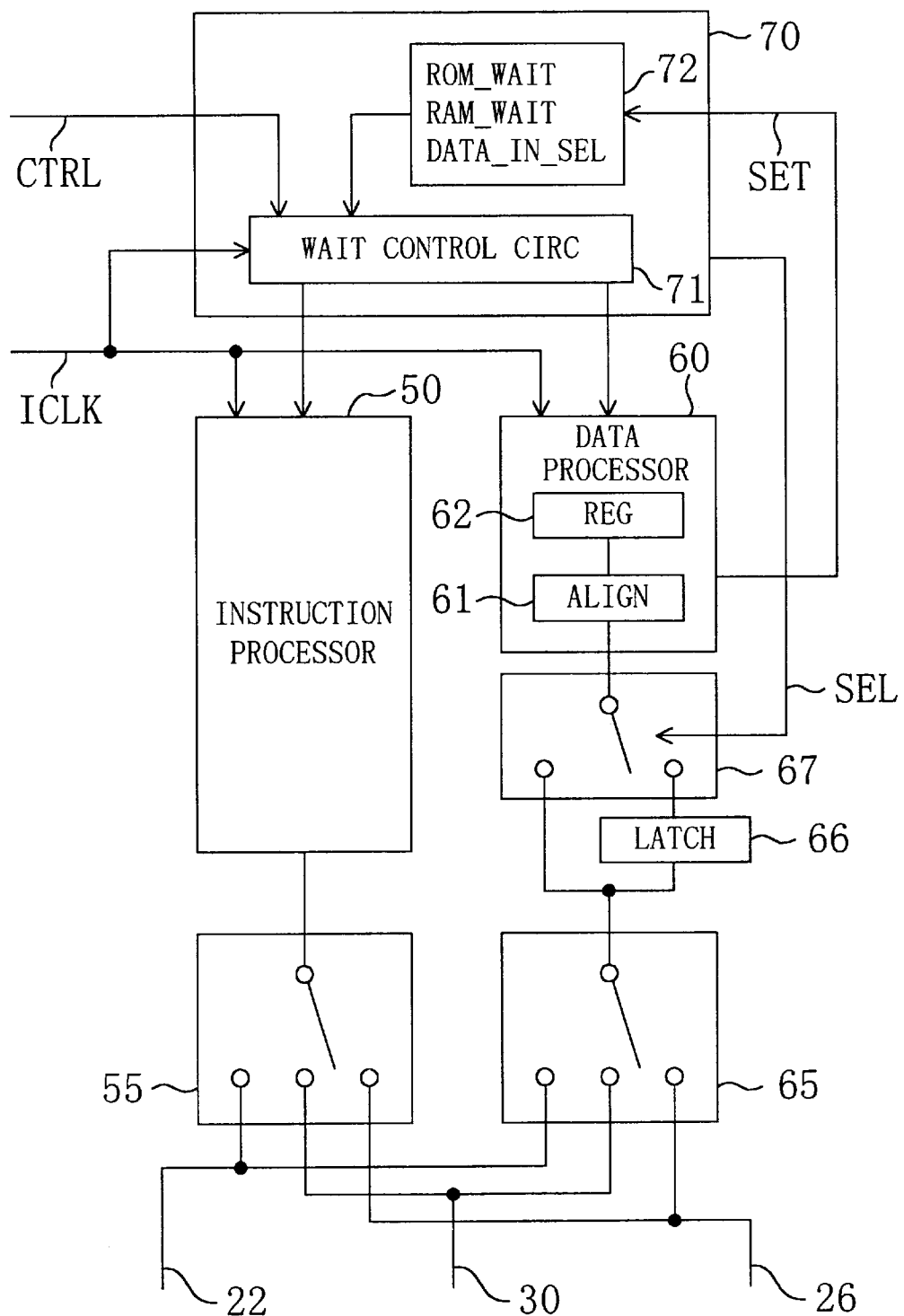
FIG. 2 is a block diagram of the internal configuration of a CPU of FIG. 1.

FIG. 2 shows the configuration of the CPU 12. The CPU 12 includes an instruction processor 50 having a pipeline structure, an instruction bus switch 55 for selectively connecting either the ROM bus 22, the RAM bus 26 or the IO bus 30 with the instruction processor 50, a data processor 60 having a pipeline structure, and a data bus switch 65 for selectively connecting either the ROM bus 22, the RAM bus 26 or the IO bus 30 with the data processor 60. The data processor 60 includes an aligner 61 for executing preprocessings (such as adjustment of a bit width through right or left shift and sign extension) on data supplied through the data bus switch 65, and a register 62 for storing the preprocessed data in synchronization with the internal clock signal ICLK. Between the data bus switch 65 and the aligner 61, a bus latch 66 and a data input switch 67 are interposed. The bus latch 66 latches data on the bus, which is selected among the ROM bus 22, the RAM bus 26 and the IO bus 30 by the data bus switch 65, in synchronization with the internal clock signal ICLK. The data input switch 67 selectively supply, to the aligner 61, either the data on the bus selected by the data bus switch 65 among the ROM bus 22, the RAM bus 26 and the IO bus 30, or the data latched by the bus latch 66.

The CPU 12 of FIG. 2 further includes a memory access controller 70 for controlling the instruction processor 50, the data processor 60 and the data input switch 67 in accordance with a cycle time of the internal clock signal ICLK. The memory access controller 70 includes a wait control circuit 71 for controlling insertion of wait cycles into a memory access processing of each of the instruction processor 50 and the data processor 60, and a set value register 72 rewritable with a register set signal SET supplied by the data processor 60. The set value register 72 stores a set value ROM_WAIT of the number of wait cycles in an access to the ROM 20, a set value RAM_WAIT of the number of wait cycles in an access to the RAM 24, and a switching set value DATA_IN_SEL for determining selecting signal SEL to be supplied to the data input switch 67. For example, when the set value ROM_WAIT is 1, a single wait cycle is inserted into an access processing to the ROM 20. When the set value ROM_WAIT is 0, no wait cycle is inserted into an access processing to the ROM 20. When the set value RAM_WAIT is 0, no wait cycle is inserted into an access processing to the RAM 24. When the set value DATA_IN_SEL is 1, an output of the data bus switch 65 is supplied to the aligner 61 through the bus latch 66, and when the set value DATA_IN_SEL is 0, an output of the data bus switch 65 is directly supplied to the aligner 61.

In the single-chip microcomputer 10 having the aforementioned configuration, when the instruction bus switch 55 selects the ROM bus 22 and the data bus switch 65 selects the RAM bus 26, the processings of instructions and data are concurrently executed. During these processings, the IO bus 30 is isolated from the instruction processor 50 and the data processor 60. Accordingly, the loads of the ROM bus 22 and the RAM bus 26 can be both decreased. In executing DMA data transfer, the DMA/test controller 36 closes either the ROM bus switch 38 or the RAM bus switch 40. As a result, the external bus terminal 32 can be directly connected with the ROM 20 or the RAM 24 not through the CPU 12. In executing a test on the ROM 20, the ROM bus switch 38 is closed, and in executing a test on the RAM 24, the RAM bus switch 40 is closed.

Now, description will be given on the case where the instruction processor 50 reads specific instructions from the ROM 20 and the data processor 60 reads specific data from the RAM 24. It is herein assumed that the internal clock signal ICLK supplied to the instruction processor 50 and the data processor 60 has a frequency of 100 MHz or 50 MHz. In other words, it is assumed that the cycle time of the internal clock signal (i.e., CPU cycle time) Tcyc is 10 ns or 20 ns. Also, time required of the instruction processor 50 from the start of reading an instruction from the ROM 20 to the receipt of the instruction (i.e., ROM access time) Trom is assumed to be 17 ns, time required of the data processor 60 from the start of reading data from the RAM 24 to the receipt of the data (i.e., RAM access time) Tram is assumed to be 8 ns, and time required for the preprocessing by the aligner 61 (i.e., aligner processing time) Talg is assumed to be 4 ns. It goes without saying that the ROM access time Trom, the RAM access time Tram and the aligner processing time Talg are not varied even when the CPU cycle time Tcyc is varied.

The three set values ROM_WAIT, RAM_WAIT and DATA_IN_SEL are determined by a user of the single-chip microcomputer 10, and are written in the set value register 72 through execution of an initializing program. The set value ROM_WAIT is determined in accordance with the relationship between the ROM access time Trom and the CPU cycle time Tcyc. Specifically, when the CPU cycle time Tcyc is 10 ns, there is a relationship of 2Tcyc>Trom>Tcyc, and hence the set value ROM_WAIT is set at 1. When the CPU cycle time Tcyc is 20 ns, there is a relationship of Trom<Tcyc, and hence the set value ROM_WAIT is set at 0. The set value RAM_WAIT is determined in accordance with the relationship between the RAM access time Tram and the CPU cycle time Tcyc. Specifically, in both the cases where the CPU cycle time Tcyc is 10 ns and 20 ns, there is a relationship of Tram<Tcyc, and hence the set value RAM_WAIT is set at 0. The set value DATA_IN_SEL is determined in accordance with the relationship between the CPU cycle time Tcyc and a sum of the RAM access time Tram and the aligner processing time Talg. Specifically, when the CPU cycle time Tcyc is 10 ns, there is a relationship of Tram+Talg>Tcyc, and hence the set value DATA_IN_SEL is set at 1 so that a data transfer path through the bus latch 66 can be selected by the data input switch 67. When the CPU cycle time Tcyc is 20 ns, there is a relationship of Tram+Talg<Tcyc, and hence the set value DATA_IN_SEL is set at 0 so that a data transfer path not through the bus latch 66 can be selected by the data input switch 67. In the case where a combination of the RAM access time Tram and the CPU cycle time Tcyc for allowing a relationship of 2Tcyc>Tram>Tcyc is adopted, the set value RAM_WAIT is set at 1. In this case, when Tram+Talg>2Tcyc, the set value DATA_IN_SEL is set at 1, and when Tram+Talg<2Tcyc, the set value DATA_IN_SEL is set at 0.

Figure 3:
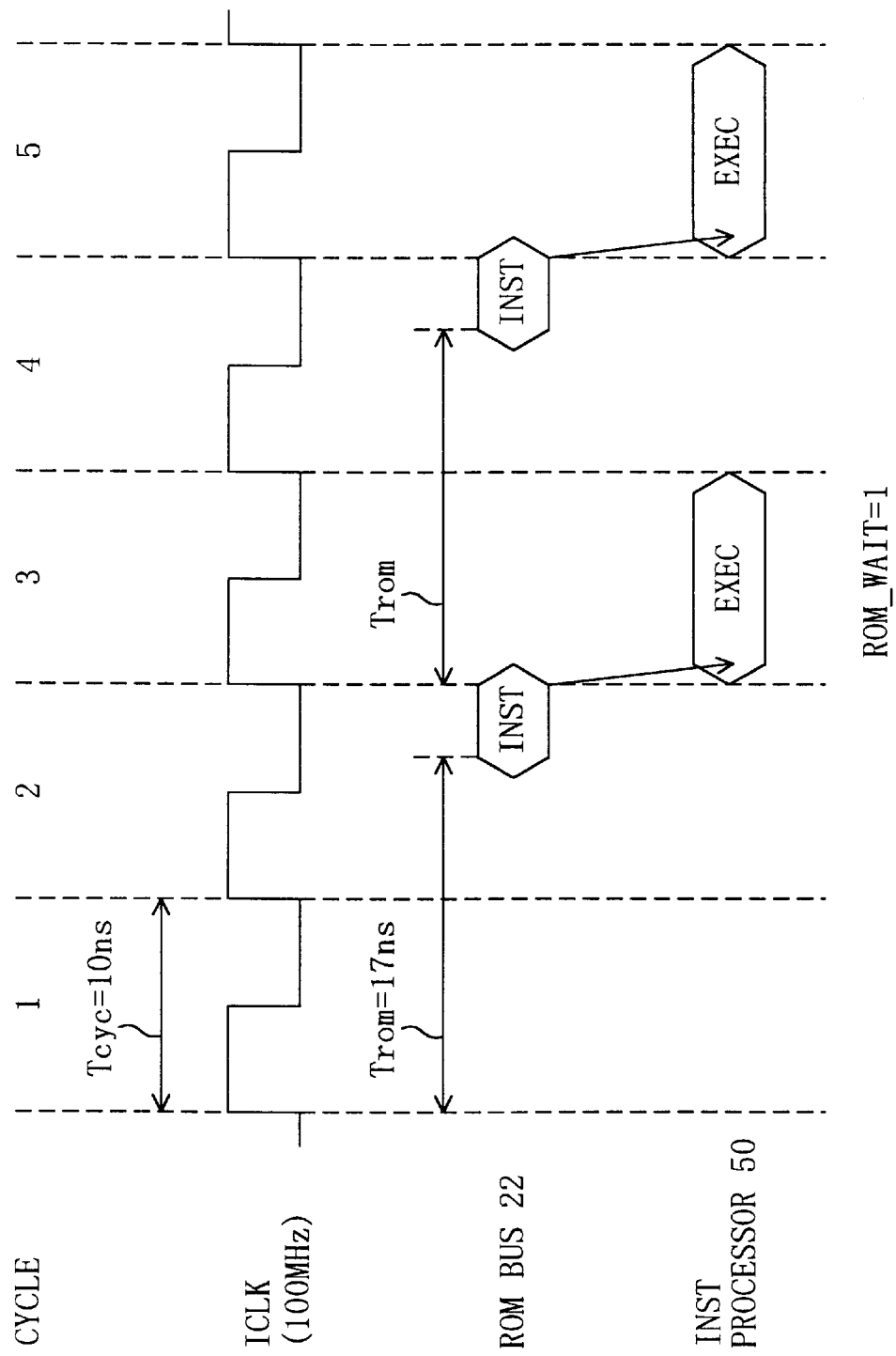
FIG. 3 is a timing chart for showing an access processing for reading a ROM of FIG. 1 executed when an internal clock signal has a frequency of 100 MHz.

FIG. 3 shows an access processing for reading the ROM 20 executed when the internal clock signal ICLK has a frequency of 100 MHz (i.e., the CPU cycle time Tcyc is 10 ns). In a cycle 1, the instruction processor 50 starts the read of a specific instruction from the ROM 20 to the ROM bus 22 in synchronization with a rise of the internal clock signal ICLK. In a cycle 2, the wait control circuit 71 controls the instruction processor 50 so that a single wait cycle can be inserted into the ROM access processing in accordance with the set value ROM_WAIT (=1) stored in the register 72. In a cycle 3, the instruction having been read to the ROM bus 22 is executed in synchronization with a rise of the internal clock signal ICLK. Also in the cycle 3, the instruction processor 50 starts the read of a subsequent instruction from the ROM 20 to the ROM bus 22 in synchronization with the rise of the internal clock signal ICLK.

Figure 4:
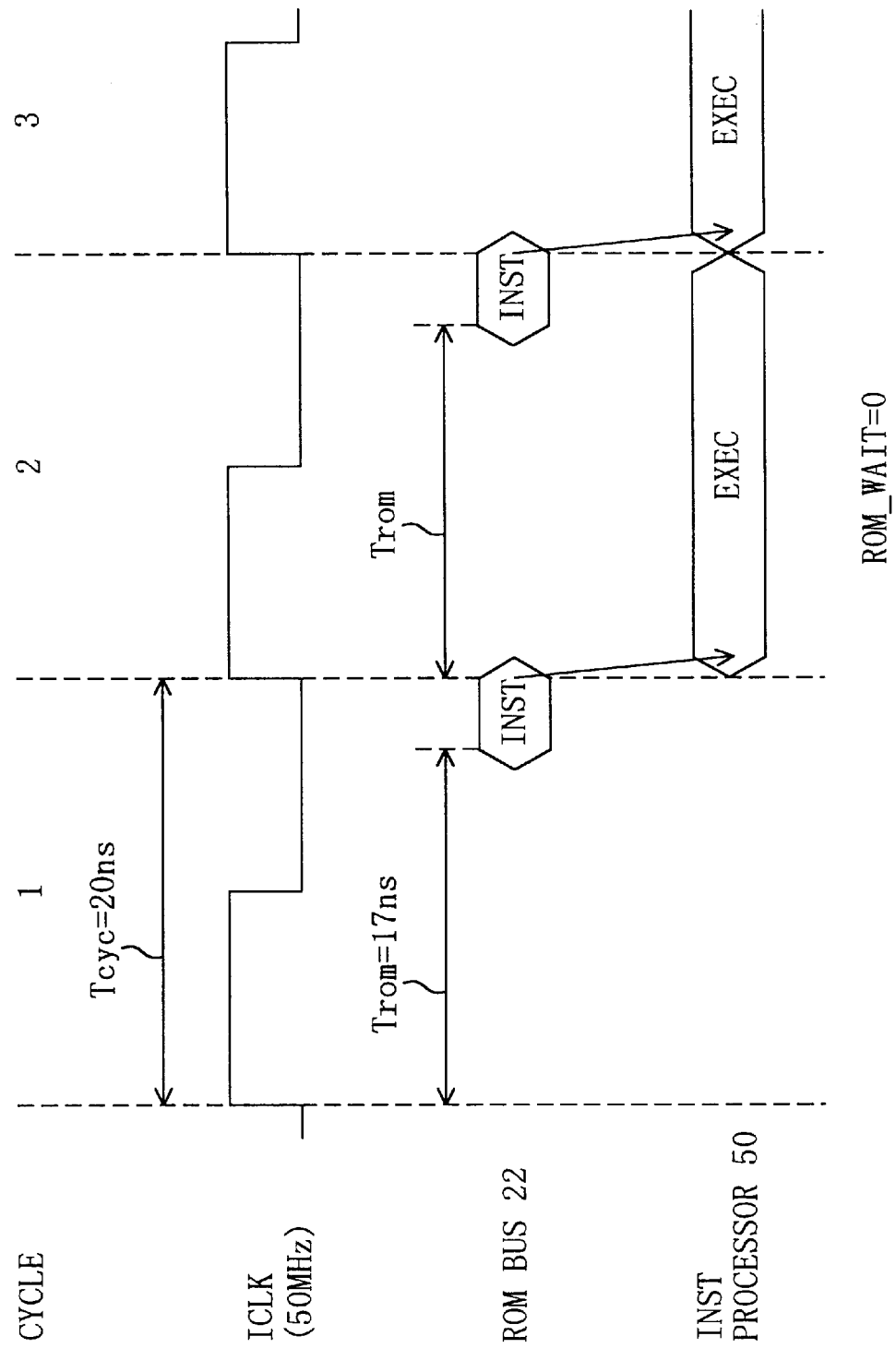
FIG. 4 is a timing chart for showing an access processing for reading the ROM of FIG. 1 executed when the internal clock signal has a frequency of 50 MHz.

FIG. 4 shows an access processing for reading the ROM 20 executed when the internal clock signal ICLK has a frequency of 50 MHz (i.e., the CPU cycle time Tcyc is 20 ns). Since the set value ROM_WAIT is set at 0, no unwanted wait cycle is inserted into the access processing of the ROM 20. An instruction read to the ROM bus 22 in a cycle 1 is immediately executed by the instruction processor 50 in a cycle 2. Also, in the cycle 2, a subsequent instruction is read from the ROM 20.

Figure 5:
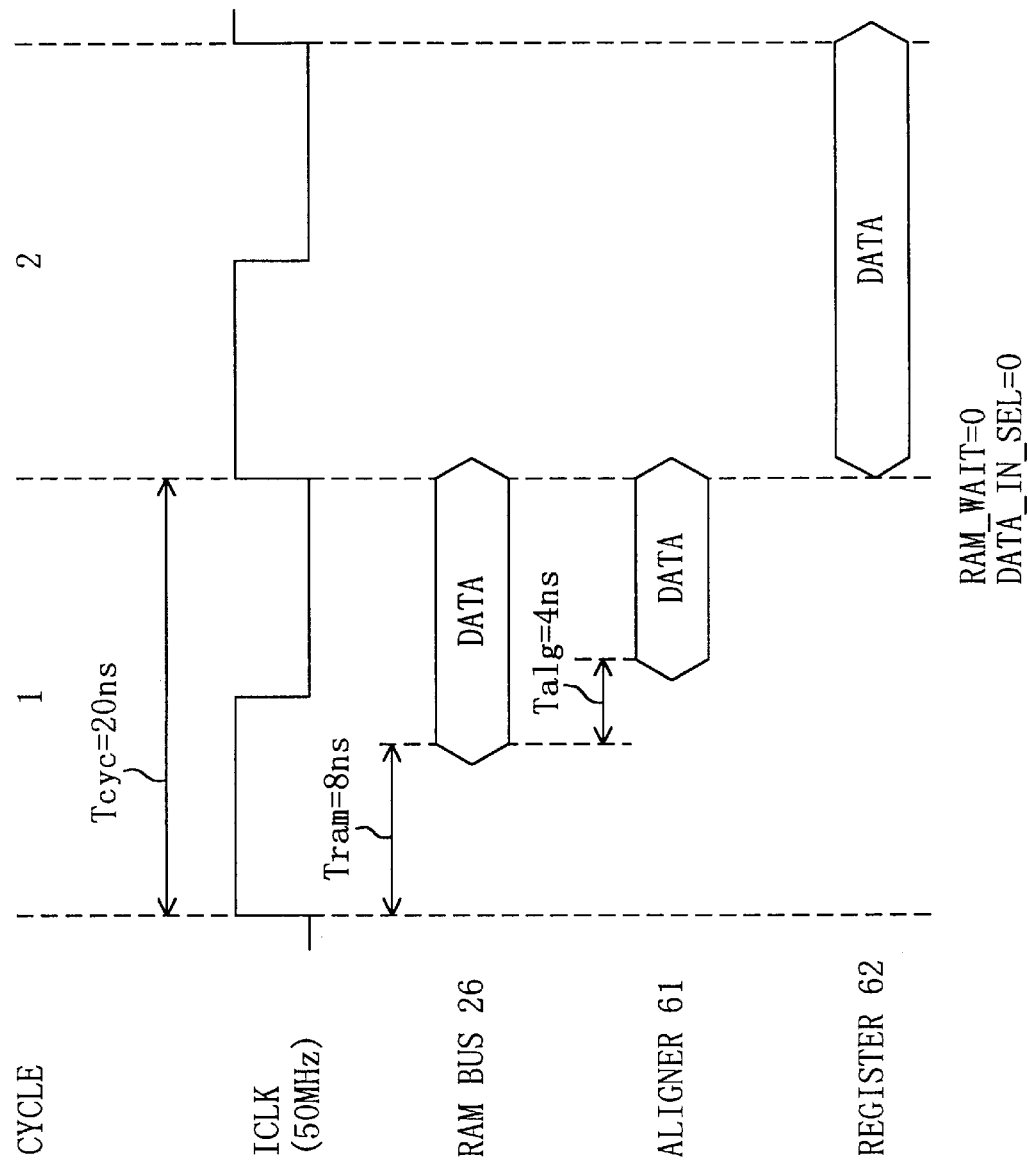
FIG. 5 is a timing chart for showing an access processing for reading a RAM of FIG. 1 executed when the internal clock signal has a frequency of 50 MHz.

FIG. 5 shows an access processing for reading the RAM 24 executed when the internal clock signal ICLK has a frequency of 50 MHz (i.e., the CPU cycle time Tcyc is 20 ns). In this case, since there is a relationship of Tram+Talg<Tcyc, the set value RAM_WAIT is set at 0 so that no unwanted wait cycle can be inserted into the access processing of the RAM 24, and the set value DATA_IN_SEL is set at 0 so that the data transfer path not through the bus latch 66 can be selected. Accordingly, when the RAM access time Tram (=8 ns) elapses after the start of a cycle 1, a specific data is read from the RAM 24 to the RAM bus 26, and the read data is immediately preprocessed by the aligner 61. The preprocessing is completed before the end of the cycle 1, and the preprocessed data is stored in the register 62 in synchronization with a rise of the internal clock signal ICLK in a cycle 2. Then, the data stored in the register 62 is further processed. The RAM bus 26 holds the data read from the RAM 24 until the end of the cycle 1. In the cycle 2, the RAM bus 26 can be used for another data access.

Figure 6:
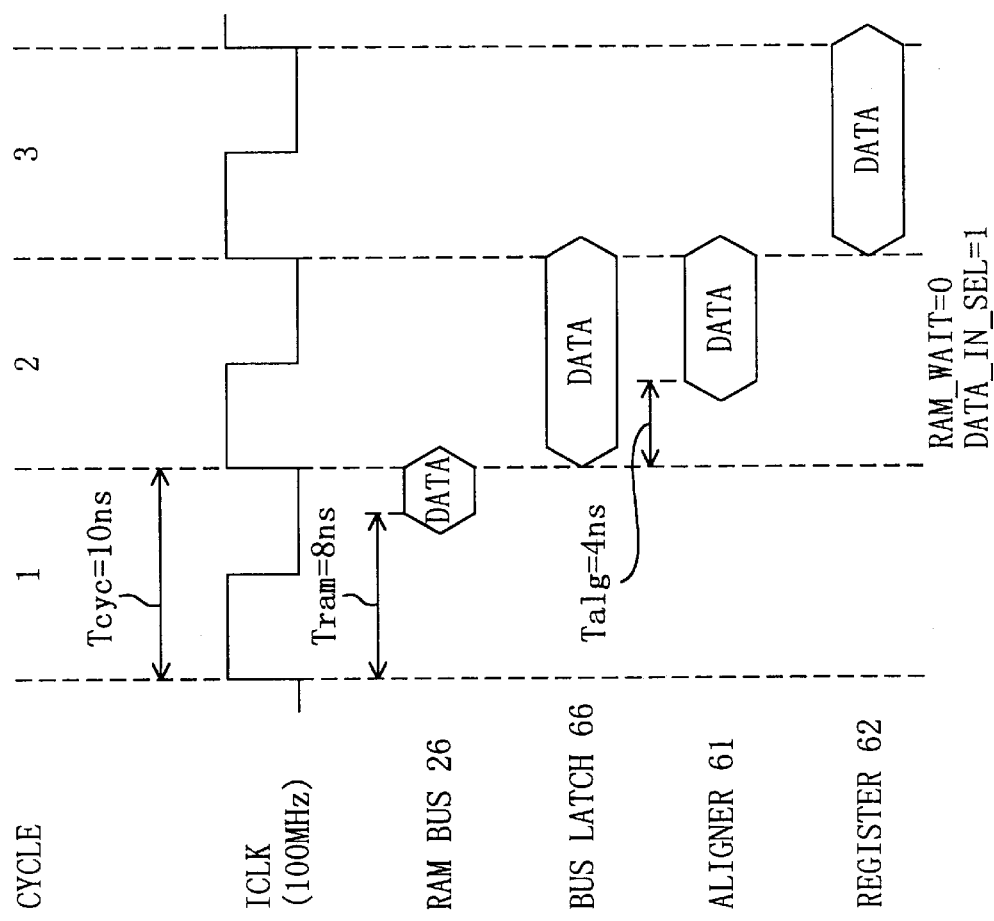
FIG. 6 is a timing chart for showing an access processing for reading the RAM of FIG. 1 executed when the internal clock signal has a frequency of 100 MHz.

FIG. 6 shows an access processing for reading the RAM 24 executed when the internal clock signal ICLK has a frequency of 100 MHz (i.e., the CPU cycle time Tcyc is 10 ns). In this case, since Tram<Tcyc and Tram+Talg>Tcyc, the set value RAM_WAIT is set at 0 so that no unwanted wait cycle can be inserted into the access processing of the RAM 24, and the set value DATA_IN_SEL is set at 1 so that the data transfer path through the bus latch 66 can be selected. Accordingly, when the RAM access time Tram (=8 ns) elapses after the start of a cycle 1, a specific data is read from the RAM 24 to the RAM bus 26, and the read data is latched by the bus latch 66 in synchronization with a rise of the internal clock signal ICLK in a cycle 2. In the cycle 2, the latched data is preprocessed by the aligner 61. The preprocessing is completed before the end of the cycle 2, and the preprocessed data is stored in the register 62 in synchronization with a rise of the internal clock signal ICLK in a cycle 3. Then, the data stored in the register 62 is further processed. The RAM bus 26 holds the data read from the RAM 24 until the end of the cycle 1. Since the data is stored in the bus latch 66, the RAM bus 26 can be used for another data access in the cycle 2. Assuming that the data transfer path not through the bus latch 66 is selected in the case of FIG. 6, the use efficiency of the RAM bus 26 can be degraded. This is because the RAM bus 26 should hold the data until the end of the cycle 2 in such a case so that the data read from the RAM 24 can be continuously supplied to the aligner 61.

In stead of setting the three set values ROM_WAIT, RAM_WAIT and DATA_IN_SEL as described above, the frequency of the external clock signal ECLK determined by the user of the single-chip microcomputer 10 can be set in the register 72. In this case, the cycle time of the internal clock signal ICLK (i.e., the CPU cycle time) Tcyc can be calculated on the basis of the frequency of the external clock signal ECLK set in the register 72 and the frequency ratio specified by the clock control signal CTRL. The ROM access time Trom, the RAM access time Tram and the aligner processing time Talg are all known. Therefore, the three set values ROM_WAIT, RAM_WAIT and DATA_IN_SEL can be automatically determined by the memory access controller 70 on the basis of these known times and the calculated CPU cycle time Tcyc.

What is claimed is:

1. A single-chip microcomputer comprising:

memory means for storing instructions and data;

bus means connected with said memory means;

clock means for supplying an internal clock signal which has a variable cycle time;

processing means for starting an access to said memory means through said bus means in synchronization with said internal clock signal to execute a specific instruction or process a specific data in synchronization with said internal clock signal; and control means, including a rewritable register for storing a set value of a number of wait cycles determined on the basis of a relationship between an access time of said memory means and a selected cycle time of said internal clock signal, for controlling said processing means to insert wait cycles in a number according to said set value stored in said register into the access to said memory means.

2. The single-chip microcomputer of claim 1, wherein said memory means includes a first memory for storing instructions and a second memory for storing data, and said bus means includes a first bus for connecting said first memory with said processing means and a second bus for connecting said second memory with said processing means.

3. The single-chip microcomputer of claim 2, further comprising:

an external bus terminal for inputting/outputting data; and a third bus for connecting said external bus terminal with said processing means independently of said first and second buses.

4. The single-chip microcomputer of claim 3, further comprising:

direct memory access control means for connecting said third bus with said first and second buses for direct memory access data transfer.

5. The single-chip microcomputer of claim 3, further comprising:

test control means for connecting said third bus with said first and second buses for tests of said first and second memories.

6. A single-chip microcomputer comprising:

memory means for storing data;

bus means connected with said memory means;

clock means for supplying an internal clock signal which has a variable cycle time;

data processing means for starting an access to said memory means through said bus means in synchronization with said internal clock signal to process a specific data in synchronization with said internal clock signal;

bus latch means for latching data read to said bus means in synchronization with said internal clock signal;

switching means for selectively supplying either data on said bus means or data latched by said bus latch means;

preprocessing means for conducting a preprocessing on data supplied from said switching means;

register means for storing the preprocessed data in synchronization with said internal clock signal; and control means, including a rewritable register for storing a switching set value determined on the basis of a relationship between a selected cycle time of said internal clock signal and a sum of an access time of said memory means and a time required for the preprocessing, for controlling said switching means in accordance with said switching set value stored in said register.

7. The single-chip microcomputer of claim 6, further comprising:

a read only memory for storing instructions; and a ROM bus connected with said read only memory.

8. The single-chip microcomputer of claim 7, further comprising:

an external bus terminal for inputting/outputting data; and an input-output bus connected with said external bus terminal independently of said bus means and said ROM bus.

9. The single-chip microcomputer of claim 8, further comprising:

direct memory access control means for connecting said input-output bus with said bus means and said ROM bus for direct memory access data transfer.

10. The single-chip microcomputer of claim 8, further comprising:

test control means for connecting said input-output bus with said bus means and said ROM bus for tests of said memory means and said read only memory.

* * * * *